J. T. WAYSON, Jr.
DRIVE CHAIN.
APPLICATION FILED NOV. 13, 1909.

973,242.

Patented Oct. 18, 1910.

WITNESSES

INVENTOR
James T. Wayson Jr
BY
ATTORNEYS

UNITED STATES PATENT OFFICE.

JAMES THOMAS WAYSON, JR., OF HONOLULU, TERRITORY OF HAWAII.

DRIVE-CHAIN.

973,242.   Specification of Letters Patent.   Patented Oct. 18, 1910.

Application filed November 13, 1909. Serial No. 527,854.

*To all whom it may concern:*

Be it known that I, JAMES T. WAYSON, Jr., a citizen of the United States, and a resident of Honolulu, in the county of Honolulu, Territory of Hawaii, have invented a new and Improved Drive-Chain, of which the following is a full, clear, and exact description.

This invention relates to certain improvements in drive chains for use in connection with sprocket wheels, and the object of the invention is to so construct the chain that the separate sections or links may be held in the proper relationship to each other, but in which the wear of one link rubbing on another will not affect the connecting means between adjacent links. In my improved chain, I provide a plurality of sections, which are not directly connected to each other but all of which are connected to a continuous flexible member. In the bending of the chain, one link may rub on the adjacent links, but this rubbing does not tend to weaken the chain.

The invention consists in the construction and combination of parts hereinafter set forth in detail and particularly defined in the claims.

Reference is to be had to the accompanying drawings, forming a part of this specification, in which similar characters of reference indicate corresponding parts in all the figures, and in which—

Figure 1:
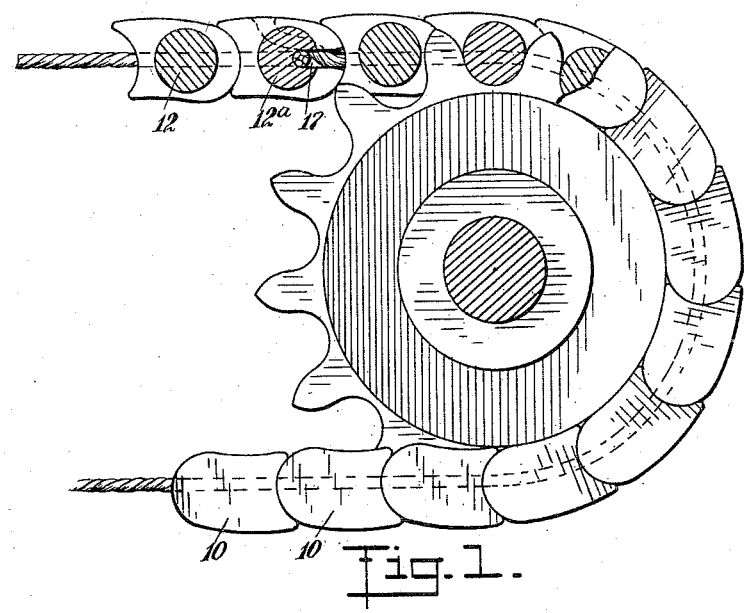
Figure 2:
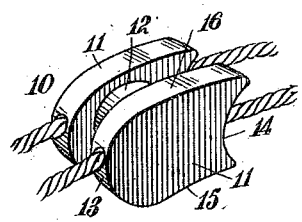
Figure 3:
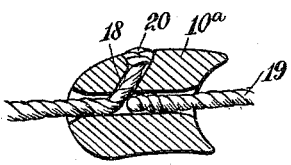
Figure 4:
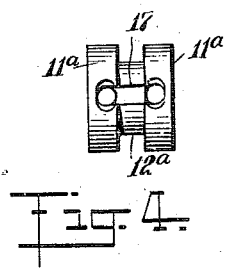

Figure 1 is a side elevation of a portion of a chain constructed in accordance with my invention and applied to a sprocket wheel; Fig. 2 is a perspective view of a single link or section of the chain; Fig. 3 is a longitudinal section through the link of a chain within which the opposite ends of the connecting member are secured; and Fig. 4 is an end view of the link shown in Fig. 3.

In the specific construction illustrated I employ a plurality of sections or links 10, each having two opposite side members or plates 11, 11, and an intermediate transverse member 12. Each side member preferably has a convex end 13 and a concave end 14, the curvature of the two ends being substantially the same, so that when a plurality of sections are placed in alinement, the convex ends of the two side plates of each section may enter the concave ends of the side plates of the next adjacent section. Preferably, one edge 15 of each plate is slightly concave and the opposite edge 16 is slightly convex, so that the convex edges 16 may properly engage with a sprocket wheel as the chain passes over the latter. The transverse or intermediate member 12 of each section is preferably substantially cylindrical in form with its ends connected to the two side plates. The diameter of the transverse member is less than the width or the length of the side plates of the section, and thus the transverse or intermediate members of two adjacent sections will be spaced apart when the two sections are brought together in alinement. The space between the transverse members serves to receive the teeth of the sprocket wheel, while the transverse members themselves engage with the sides of the teeth and compel the chain to travel with the peripheral portion of the sprocket wheel engaging therewith. In order to reduce friction, the transverse or intermediate members may be, if desired, in the form of rollers, mounted on smaller bars or spindles extending through from one side plate to the other.

For connecting together the several sections, each side plate is provided with an opening or passage lengthwise thereof, and two parallel runs of flexible cable are passed through the openings of the side plates of all of the sections. The sections are all held with the concave end of each receiving the convex end of the next section, and the flexibility of the cable permits the sections to move in respect to each other, but the movement of one section in respect to the other, or the wear of the adjacent ends of the sections, does not affect the security with which said sections are held together. Only one of these sections is fixed in position on the cable, but there is no tendency for them to slip along the cable, as the cable merely serves to hold them in proper relationship to each other. In the preferred construction, I employ a twisted wire cable for securing the sections, although it is evident that a rope, cord, chain, wire or any other similar flexible member would constitute a mechanical equivalent of the wire cable illustrated.

For securing the ends of the cable and for making the chain continuous, one of the links is preferably constructed somewhat different from the remaining links. This link 10$^a$ has a transverse passage or groove 17 in the cylindrical transverse member 12$^a$ and communicating with the longitudinally-extending passages in the side plates 11ᵃ. In addition to these longitudinally-extending passages, each side plate has a passage 18 extending from the outer edge of the plate inwardly to intersect the longitudinally-extending passages.

In assembling the sections or links, the two opposite ends of the cable 19 are passed through the two longitudinal openings of the side plates and the center of the cable is brought into the transverse passage 17. The other sections are then strung upon the cable until the chain is formed of the desired length and the two cable ends are then extended into the link 10ᵃ and through the passages 18 in the latter. The outer end of the cable may be secured within these passages in any suitable manner, but as illustrated they are each provided with a knot or enlargement 20, which cannot pass back through the link. All of the links are thus permanently and effectively connected together, and each may have the proper movement relatively to the others.

Having thus described my invention, I claim as new and desire to secure by Letters Patent:

1. A chain, comprising a continuous flexible cable, and a plurality of sections loosely mounted thereon and having sliding engagement with each other.

2. A chain link or section having two side plates and a transverse connecting member, each of said side plates having a convex end and a concave end, and said connecting member being substantially cylindrical in cross section and of less diameter than the width or length of the side plates.

3. A chain link or section having two side plates and a transverse connecting member, each of said side plates having a convex and a concave end, said connecting member being substantially cylindrical in cross section and of less diameter than the width or length of the side plates, and each side plate having a passage extending longitudinally therethrough.

In testimony whereof I have signed my name to this specification in the presence of two subscribing witnesses.

JAMES THOMAS WAYSON, Jr.

Witnesses:
 IRWIN H. BEADLE,
 FRED. LAMB.